US009203785B2

(12) United States Patent
Eikenberry et al.

(10) Patent No.: US 9,203,785 B2
(45) Date of Patent: *Dec. 1, 2015

(54) NET-BASED EMAIL FILTERING

(71) Applicant: Dell Software Inc., Round Rock, TX (US)

(72) Inventors: Scott Eikenberry, Menlo Park, CA (US); John Gmuender, San Jose, CA (US); Akbal Singh Karlcut, Cupertino, CA (US); Michael Carl Y. Uy, San Jose, CA (US); Boris Yanovsky, Saratoga, CA (US)

(73) Assignee: Dell Software Inc., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/166,641

(22) Filed: Jan. 28, 2014

(65) Prior Publication Data

US 2014/0150082 A1    May 29, 2014

Related U.S. Application Data

(63) Continuation of application No. 13/155,819, filed on Jun. 8, 2011, now Pat. No. 8,671,447.

(60) Provisional application No. 61/353,183, filed on Jun. 9, 2010.

(51) Int. Cl.
*H04L 29/06* (2006.01)
*H04L 12/58* (2006.01)

(52) U.S. Cl.
CPC ............. *H04L 51/00* (2013.01); *H04L 12/585* (2013.01); *H04L 51/12* (2013.01)

(58) Field of Classification Search
CPC ........ H04L 12/585; H04L 63/20; H04L 51/12
USPC .......................... 726/4, 12; 709/206
See application file for complete search history.

(56) References Cited

U.S. PATENT DOCUMENTS 7,756,929 B1 *  7/2010  Pettigrew et al. ............. 709/206
8,671,447 B2    3/2014  Eikenberry
(Continued)

OTHER PUBLICATIONS

Rieck, "Language Models for Detection of Unknown Attacks in Network Traffic", Feb. 2007, Journal in Coputer Virology, p. 243-256.*

(Continued)

*Primary Examiner* — Taghi Arani
*Assistant Examiner* — Gregory Lane
(74) *Attorney, Agent, or Firm* — Lewis Roca Rothgerber LLP

(57) ABSTRACT

A local gateway device receives email across the internet from a sender of the email and forwards it across the internet to an email filtering system. The email filtering system analyzes the email to determine whether it is spam, phishing or contains a virus and sends it back to the local gateway device along with the filtered determination. The local gateway device forwards the received email and the filtered determination to a local junk store which handles the email appropriately. For example, if the email has been determined to be spam, phishing or containing a virus, the junk store can quarantine the email and if the email has been determined to be non-spun and/or not phishing and/or not containing a virus, the junk store can forward the email to a local mail server for delivery.

15 Claims, 4 Drawing Sheets

(56) References Cited

U.S. PATENT DOCUMENTS

| | | | |
|---|---|---|---|
| 2005/0188035 A1* | 8/2005 | Ueno | 709/206 |
| 2008/0141346 A1* | 6/2008 | Kay et al. | 726/4 |
| 2008/0256622 A1* | 10/2008 | Neystadt et al. | 726/14 |
| 2009/0064323 A1* | 3/2009 | Lin | 726/22 |
| 2009/0182818 A1* | 7/2009 | Krywaniuk | 709/206 |
| 2010/0082758 A1 | 4/2010 | Golan | |
| 2011/0307950 A1 | 12/2011 | Eikenberry | |

OTHER PUBLICATIONS

U.S. Appl. No. 13/155,819, Office Action mailed Jun. 5, 2013.

* cited by examiner

NET-BASED EMAIL FILTERING

CROSS-REFERENCE TO RELATED APPLICATIONS

The present application is a continuation and claims the priority benefit of U.S. patent application Ser. No. 13/155,819 filed Jun. 8, 2011, which claims the priority benefit of U.S. provisional application 61/353,183 filed Jun. 9, 2010, the disclosures of which are incorporated herein by reference.

BACKGROUND OF THE INVENTION

1. Field of the Invention

The invention is in the field of electronic mail ("email"), and more particularly in the field of filtering email for spam, phishing and viruses.

2. Description of the Related Art

Email has become a business critical form of communication. Resultantly, protecting email systems from attack, abuse and misuse has become increasingly important.

Early attempts required directing all external email traffic to first pass through a third-party system which provided various forms of protection, However, this required changing mail server addressing which added complexity, limited flexibility and was not always desirable.

Another prior approach was to place a protection device at the front-end of a local network to receive all external email traffic, An example of this approach is shown in FIG. 1 where a firewall device 130 is placed in front of a mail server 150. With this arrangement, firewall device 130 receives all email traffic coming to a local protected network 140 from a mail sender such as Mail Transfer Agent ("MTA") 110 across internet 120. Firewall device 130 typically provides services such as attack prevention and email virus scanning.

In order to provide protection against email spam, also known as junk email, a separate device was typically placed between firewall 130 and mail server 150, as shown in FIG. 2, where an anti-spam appliance 145 can be seen in communication between firewall 130 and mail server 150. Anti-spam appliance 145 receives emails from firewall 130 and prevents those that are spam from reaching mail server 150. However, installing, configuring and managing yet another piece of equipment further complicates things.

As a result, in a more recent prior approach, firewall 130 was sometimes replaced by a Unified Threat Management ("UTM") gateway device which incorporated attack prevention, email virus scanning, anti-spam functionality, etc., into a single device. However, including this much functionality into a single device increased cost and complexity and required the device to have greater processing, memory and storage capacity.

It would be desirable to reduce such cost, complexity and device capacity, while still eliminating additional equipment, yet still provide a high level of protection services.

SUMMARY OF THE PRESENTLY CLAIMED INVENTION

In one embodiment is an email filtering process comprising the steps of receiving email at a UTM gateway from an MTA across a first internet-based communication connection, sending the received email from the UTM gateway to an Email Security Appliance across a second internet-based communication connection, receiving the email with a filtered status at the UTM gateway from the E Security Appliance across a third internet-based communication connection, and sending the email with the filtered status from the UTM gateway to a Junk Store across a first local communication connection.

In a further embodiment, the email filtering process further comprises, before receiving email at the UTM Gateway from the MTA across a first internet-based communication connection, the steps of establishing the first internet-based communication connection between the UTM gateway and the MTA, establishing the second internet-based communication connection between the UTM gateway and the Email Security Appliance, establishing the third internet-based communication connection between the UTM gateway and the Email Security Appliance, and establishing the first local communication connection between the UTM gateway and a Junk Store.

In a still further embodiment, the email filtering process further comprises sending email filter processing rules from the UTM Gateway to the Email Security Appliance.

In a yet further embodiment, the email filtering process further comprises processing the email at the Email Security Appliance to determine whether it is a spam, phishing or virus containing email or a non-spam, non-phishing or not virus containing email and either giving the email a filtered status indicating spam, phishing or virus containing if the email is determined to be a spam, phishing or virus containing email or giving the email a filtered status indicating non-spam, non-phishing or not virus containing if the email is determined to not be spam, not be phishing or not containing a virus.

In a still further embodiment, the email filtering process further comprises quarantining the received email at the Junk Store if the email with the filtered status indicates that the email is spam or sending the received email from the Junk Store to a local mail server if the email with the filtered status indicates that the email is non-spam.

In a yet still further embodiment, the email filtering process further comprises checking the reputation of the IP address of the MTA against an allow list and a block list on the UTM Gateway.

In a yet further embodiment, the email filtering process further comprises checking the IP address of the MTA by the UTM Gateway checking with an IP Address Reputation Service.

In a yet still further embodiment, the email filtering process further comprises scanning the email received at the UTM Gateway from the MTA for viruses before sending the received email from the UTM Gateway to the Email Security Appliance.

DETAILED DESCRIPTION

A local gateway device receives email across the internet from a sender of the email, The local gateway device forwards the email across the internet to a filtering system. The filtering system analyzes the email to determine whether it is spam, phishing or contains a virus and sends it back to the local gateway device along with the filtered determination. The local gateway device forwards the received email and the filtered determination to a local junk store which handles the email appropriately. For example, if the email has been determined to be spam, phishing or to contain a virus, the junk store can quarantine the email and if the email has been determined to be non-spam and/or not phishing and/or to not contain a virus, the junk store can forward the email to a local mail server for delivery.

In one embodiment, the local gateway device provides filtering rules (otherwise known as settings) to the external filtering system. In this way, the local gateway device can control how email is to be processed by the filtering system and ultimately handled by the junk store and local mail server.

Communication between the local gateway device and the sender of the email operates in a typical fashion thus eliminating need for any internet email addressing changes (e.g., no changes need to be made to Mail Exchanger ("MX") records held at public Domain Name Service ("DNS") servers), etc. Further, as explained elsewhere herein, in some embodiments communication connections are established and maintained in a way to ensure integrity of the filtering operation. Offloading the filtering processing to the external filtering system eliminates the need for a local anti-spam appliance and also reduces processing, memory and storage capacity requirements of such functionality which might otherwise be performed within the local gateway device.

Figure 1:
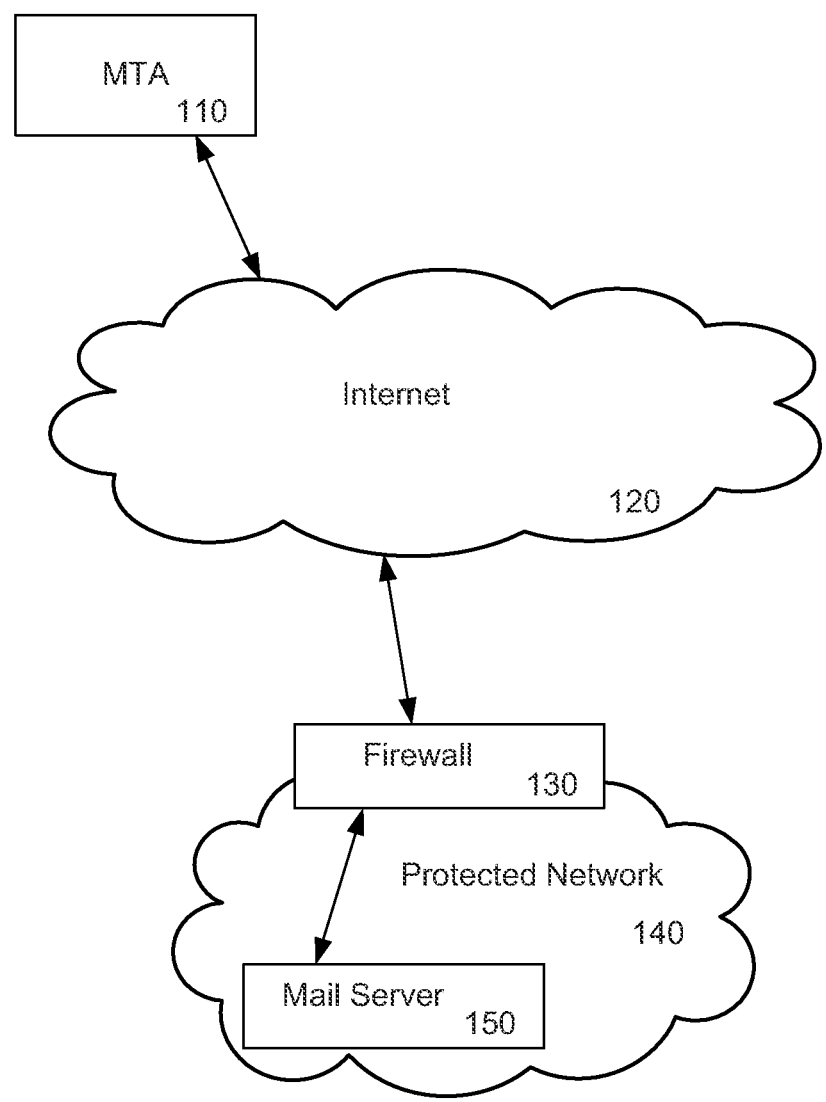
FIG. 1 is a diagram of a prior art system.
Figure 2:
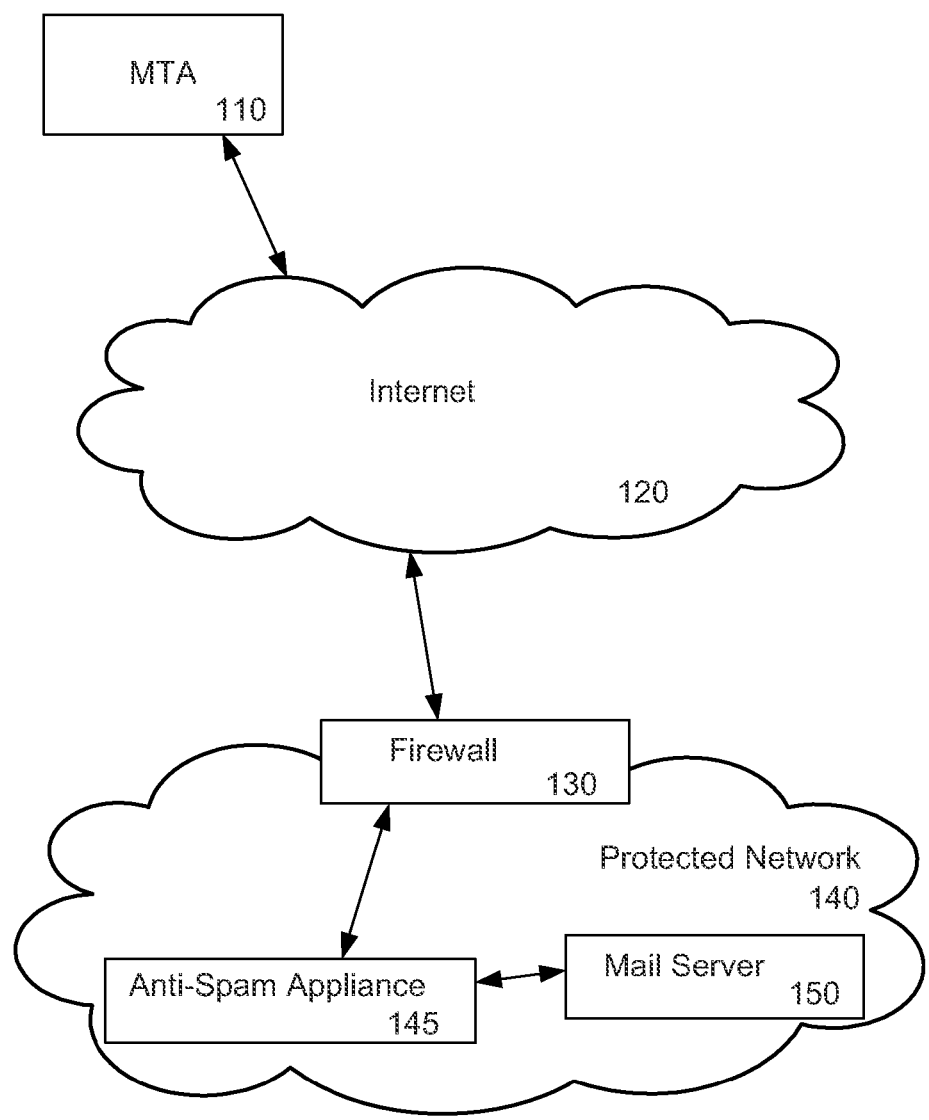
FIG. 2 is a diagram of another prior art system.
Figure 3:
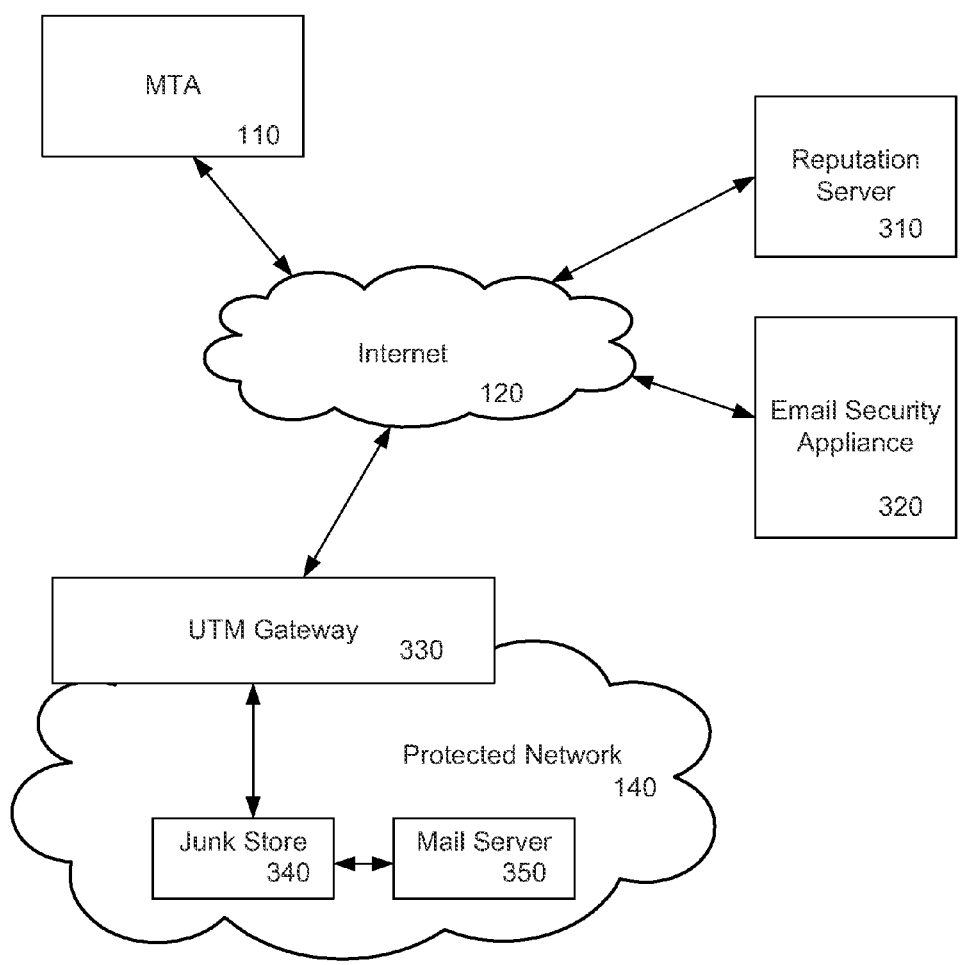
FIG. 3 is a diagram of one embodiment of the present system.

Referring now to FIG. 3, a diagram of one embodiment of the present system can be seen. MTA 110 is any sender of email across internet 120. UTM Gateway 330 is UTM or firewall device comprising any combination of hardware, software or firmware to perform threat management functionality as well as the functionality described herein. Protected Network 140 is a communications network that is protected against unauthorized access or use and can be a local area network, a wide area network, a virtual private network, or any combination thereof, Junk Store 340 is a hardware and/or software facility that stores or quarantines spam, phishing, and virus containing email. Mail Server 350 is a hardware and/or software server that provides email services. Junk Store 340 and Mail Server 350 may be physically separate servers or may be combined in a single physical server. Reputation Server 310 is an interact accessible server that keeps track of known good and known bad Internet Protocol ("IP") addresses, Email Security Appliance ("ESA") 320 is a server that performs email filtering as described elsewhere herein. It is to be understood that Reputation Server 310 and Email Security Appliance 320 may be physically separate servers, either co-located or in separate locations, or may be combined in a single physical server.

In a preferred embodiment, UTM Gateway is a UTM or firewall device, with some portions comprising software provided on a computer readable medium, all as sold by SonicWALL, Inc. of Sunnyvale, Calif., Junk Store 340 is software provided by SonicWALL, Inc., on a computer readable medium, Mail Server 350 is a Microsoft Exchange Server® software sold by Microsoft, Corp. to be run on a server, and Reputation Server is software provided by SonicWALL, Inc. on a computer readable medium to be run on a server.

In operation, MTA 110 communicates across Internet 120 with UTM Gateway 330 to establish a communication connection to send email from MIA 110 to Mail Server 350. Optionally, UTM Gateway 330 communicates across Internet 120 with Reputation Server 310 to first check the reputation of MTA 110. UTM Gateway 330 then communicates with Email Security Appliance 320 across interact 120 to establish a communication connection. UTM Gateway 330 also communicates across Protected Network 140 (e.g., a local area network) to establish a communication connection with Junk Store 340. Junk Store 340 communicates across Protected Network 140 to establish a communication connection with Mail Server 350.

Then, when MTA 110 sends email to UTM Gateway 330 across Internet 120, UTM Gateway 330 forwards that email across Internet 120 to Email Security Appliance 320 for filtering. Email Security Appliance 320 performs filtering on the forwarded email and sends it back across Internet 120 to UTM Gateway 330 along with a filtered determination. UTM Gateway 330 forwards the email with the filtered determination across Protected Network 140 to Junk Store 340. Junk Store 340 then handles the email according to the filtered determination. For example, if the filtered determination indicates that the email is spam, phishing or contains a virus, Junk Store 340 can quarantine the email and if the filtered determination indicates that the email is non-spam and/or is not phishing and/or does not contain a virus, Junk Store 340 can send the email across Protected Network 140 to Mail Server 350 for delivery.

Figure 4:
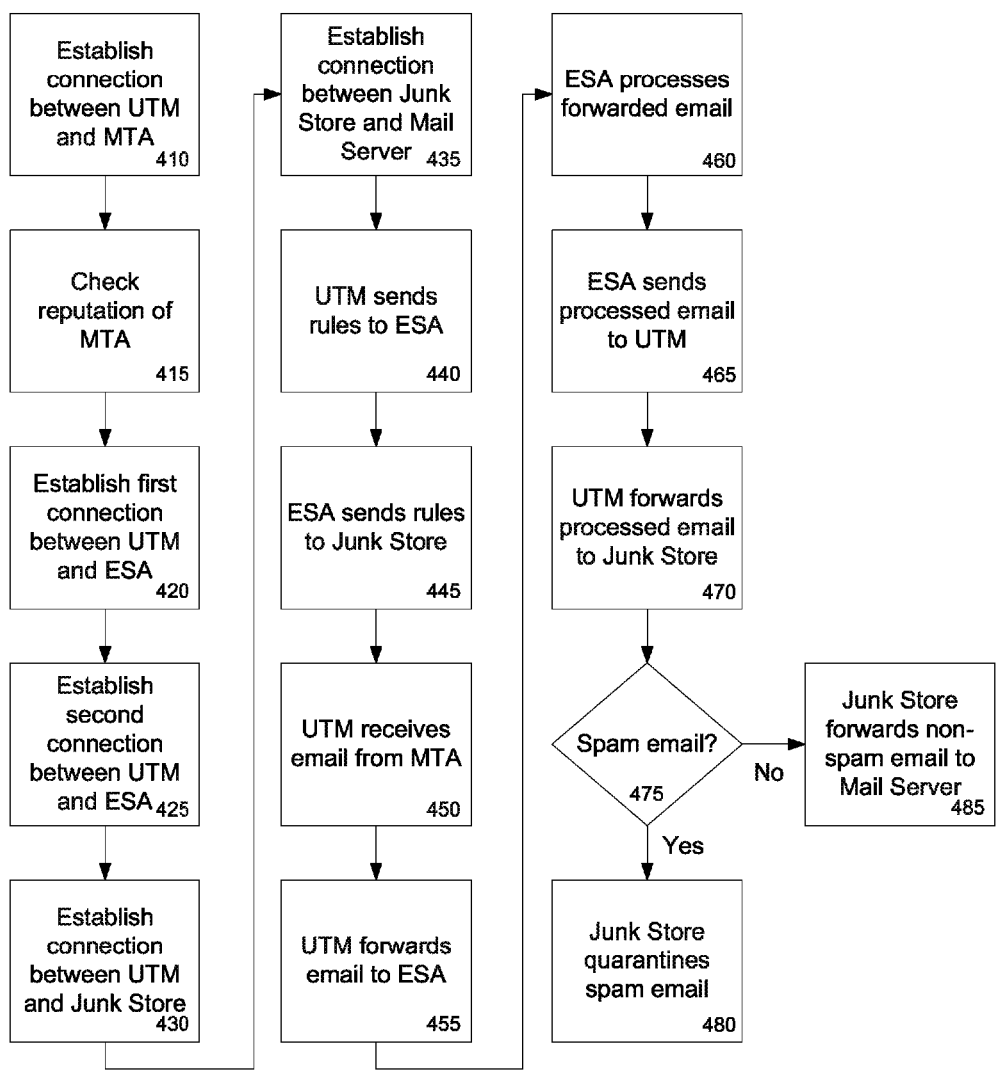
FIG. 4 is a flowchart of one embodiment of the present method.

Referring now to FIG. 4, a flowchart depicting one embodiment of the present method can be seen.

In Step 410, a communication connection is established between UTM Gateway 330 and MTA 110. This occurs when MTA 110 contacts UTM Gateway 330 on, for example, port 25 of UTM Gateway 330 with a Simple Mail Transfer Protocol ("SMTP") Terminal Control Protocol ("TCP") handshake Synchronize ("SYN") message. To ensure that MTA 110 is a valid TCP endpoint, a modified handshake is used by UTM Gateway 330 by embedding a cookie within a Synchronize-Acknowledge ("SYN-ACK") response from UTM Gateway 330 to MTA 110. The presence and value of this cookie is verified by UTM Gateway 330 when it is received with the final handshake Acknowledge ("ACK") sent by MTA 110 to UTM Gateway 330. If the cookie is not present or is invalid in this ACK message, the attempted connection from MTA 110 is refused by UTM gateway 330. This prevents attacks, such as SYN Flood attacks, which could otherwise tie up resources through proliferation of incomplete connections.

In Step 415, the reputation of MTA 110 is checked. In particular, a reputation check is done on the IP address of MTA 110. The reputation of MTA 110's IP address is checked by first consulting an allow list and a block list within UTM Gateway 330. If the IP address of MTA 110 is found on the block list within UTM Gateway 330, the connection with MTA 110 is refused. If the IP address of MTA 110 is found on the allow list within UTM Gateway 330 then the connection with MTA 110 is established and the process continues. If the IP address of WA 110 is not found on either the allow list or the block list of UTM Gateway 330 then UTM Gateway 330 checks the reputation of the IP address of MTA 110 with Reputation Server 310 by communicating across internet 120.

Reputation Server 310 looks up the IP address of MTA 110 within its internal database and sends a DNS answer to UTM Gateway 330 in the form of 127.0.0.X where X signifies the reputation of the IP address. Exemplary possible values for X are:

nnn.0.0.1: MTA 110 is not a known spam source
nnn.0.0.2: MTA 110 is an open relay
nnn.0.0.3: MTA 110 is a dialup spam source
nnn.0.0.4: MTA 110 is a spam source
nnn.0.0.5: MTA 110 is a smart host (relays for sites that are not secure)
nnn.0.0.6: MTA 110 is a spam-ware site
nnn.0.0.7: MTA 110 is a bad email list server
nnn.0.0.8: MTA 110 uses an insecure script
nnn.0.0.9: MTA 110 is an open proxy server If the received IP address reputation response from Reputation Server 310 indicates that the IP address of MTA 110 is valid UTM Gateway 330 will proceed with the SMTP connection to MTA 110.

In Step 420, a first communication connection is established between UTM Gateway 330 and Email Security Appliance 320. In particular, UTM Gateway 330 initiates an SMTP connection across internet 120 to port 25 of Email Security Appliance 320. This internet-based communication connection is established using the standard SMTP protocol sequence of SYN, SYN-ACK and ACK messaging between UTM Gateway 330 and Email Security Appliance 320.

In Step 425, a second communication connection is established between UTM Gateway 330 and Email Security Appliance 320. In particular, Email Security Appliance 320 initiates an SMTP connection across internet 120 to UTM Gateway 330. However, unlike the first internet-based communication connection between UTM Gateway 330 and Email Security Appliance 320 which used the reserved SMTP TCP port 25, Email Security Appliance 320 initiates the second internet-based communication connection using port 10025 of .sup.-UTM Gateway 330. Use of port 10025 of UTM Gateway 330 for the second communication connection, rather than port 25 of UTM Gateway 330, ensures that the logical path used by unprocessed email from MTA 110 to UTM Gateway 330 differs from the logical path used for processed email from Email Security Appliance 320 to UTM Gateway 330. It is to be understood that an alternative port of UTM Gateway 330 could be used for the second communication instead of port 10025. Such alternative port could be one of a range of ports to be used, for example, in the event an Internet Service Provider (ISP) or other firewall is blocking port 10025.

In Step 430, a communication connection is established between UTM Gateway 330 and Junk Store 340, In particular, using Network Address Translation ("NAT") redirect as known in the art, UTM Gateway 330 establishes a first local communication connection with Junk Store 340. In combination with the second communication connection between Email Security Appliance and WWI Gateway 330, this sets up a communication pathway from Email Security Appliance 320 through UTM Gateway 330 to Junk Store 340.

In Step 435, a communication connection is established between Junk Store 340 and Mail Server 350. In particular Junk Store 340 initiates a second local communication connection via an internal SMTP connection to port 25 of Mail Server 350.

In Step 440, UTM Gateway 330 optionally sends email filtering rules (settings) to Email Security Appliance 320. As explained further elsewhere herein, the email filtering rules provide Email Security Appliance 320 with the information to fitter email for UTM Gateway 330 and are sent from UTM Gateway 330 to Email Security Appliance 320 in a custom SMTP Hello ("HELO") command referred to herein as a SonicWALL Hello ("SHLO") command.

In Step 445, Email Security Appliance 320 sends some or all of the email filtering rules to Junk Store 340. In particular, Email Security Appliance 320 sends some or all of the email filtering rules through URI Gateway 330 to Junk Store 340 using the custom SHLO command. This provides Junk Store 340 with the information necessary to handle processed. email as explained elsewhere herein.

In Step 450, UTM Gateway 330 receives email from MTA 110. In particular, MTA 110 sends an email over the internet-based communication connection established between UTM Gateway 330 and MTA 110 in a typical fashion as known in the art.

In Step 455, UTM Gateway 330 forwards the received email to Email Security Appliance 320. In particular, UTM Gateway 330 forwards the email across the first internet-based communication connection between UTM Gateway 330 and Email Security Appliance 320.

In an optional step (not shown), UTM Gateway 330 scans the SMTP traffic of the email sent by MTA 110 for virus signatures and takes appropriate action.

In Step 460, Email Security Appliance 320 processes the forwarded email according to the email filtering rules. In particular, Email Security Appliance processes the forwarded email according to its filtering capabilities and the email filtering rules and gives the email a filtered status indicating whether or not it was determined to be spam, phishing, or virus containing email.

In Step 465, Email Security Appliance 320 sends the processed email with the filtered determination to UTM Gateway 330. In particular, Email Security Appliance 320 sends the processed email with the filtered determination across the second interact-based communication connection to UTM Gateway 330.

In Step 470, UTM Gateway 330 forwards the processed email with the filtered determination to Junk Store 340. In particular, UTM Gateway 330 forwards the processed email with the filtered determination across the first local communication connection to Junk Store 340.

In Step 475, Junk Store 340 reviews the filtered determination of the received email and handles it in accordance with the filtering rules received in step 445. If the filtered determination of the email indicates that the email is spam, phishing or contains a virus, then in Step 480, Junk Store 340 quarantines the email, Alternatively, if the spam determination of the email indicates that the email is non-spam and/or is not phishing and/or does not contain a virus, then in Step 485, Junk Store 340 forwards the email to Mail Server 350 for delivery.

SHLO commands, as explained elsewhere herein, are optionally used to provide Email Security Appliance 320 with filtering rules for filter processing and are exchanged within an SMTP connection using TCP ports 25 and 10025. In one embodiment, SHLO commands are American Standard Code for Information Interchange ("ASCII") text encoded and use simple name-value pairs to convey information, Names are defined for the exchange of:
 a. Authentication "token"
 b. Serial number of UTM Gateway 330
 c. IP address of MTA 110
 d. IP address reputation mechanism used (e.g., allow list at URI Gateway 330 and/or Reputation Server 310)
 e. Action to take for spam, phishing and virus emails (e.g., allow, tag, quarantine, reject, delete)

The following is an example of a SHLO message sent by UTM Gateway 330 to Email Security Appliance 320:
 SHLO sn=94d8f1 hk=a73cf9 ls=q ds=d lp=t dp=q lv=q dv=d si="nnnn.nnnn.nn.n" js=1 co=1
 Where:
 sn=94d8f1 is the encoded serial number of UTM gateway 330
 hk=a73cf9 is the authentication token
 ls=q indicates emails determined to be "likely spam" should be quarantined
 ds=d indicates emails determined to be "definite spam" should be deleted
 lp=t indicates emails determined to be "likely phishing" should be tagged
 dp=q indicates emails determined to be "definite phishing" should be quarantined lv=q indicates emails determined to be "likely virus" should be quarantined dv=d indicates emails determined to be "definite virus" should be deleted si="nnn.nnn.nn.n" is the IP address of MTA 110 js=1 indicates that Junk Store 340 is currently running and healthy co=1 indicates a status determined by UTM Gateway 330 probing on status of Email Security Appliance 320

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, the description and the drawing should not be considered in a limiting sense, as it is understood that the present invention is in no way limited to only the embodiments illustrated.

What is claimed is:

1. An email filtering system comprising:
a unified threat management gateway that:
receives an email from a mail transfer agent across a first internet-based communication connection, and
checks a reputation of an internet protocol address of the mail transfer agent;
an email security appliance that:
receives the email from the unified threat management gateway across a second internet-based communication connection,
processes the email to determine a filtered status of the email, and
sends the email with the filtered status to the unified threat management gateway across a third internet-based communication connection; and wherein the unified threat management gateway further:
sends the email with the filtered status to a junk store across a local communication connection, and
sends email filter processing rules to the email security appliance, wherein the unified threat management gateway sends email filter processing rules using a custom simple mail transfer protocol HELO command using a transmission control protocol port, and wherein the HELO command comprises ASCII encoded text using name-value pairs to convey information.

2. The email filtering system of claim 1, wherein:
the first internet-based communication connection is established between the unified threat management gateway and the mail transfer agent;
the second internet-based communication connection is established between the unified threat management gateway and the mail transfer agent;
the third internet-based communication connection is established between the unified threat management gateway and the email security appliance; and
the local communication connection is established between the unified threat management gateway and the junk store.

3. The email filtering system of claim 1, wherein the junk store quarantines the email with the filtered status when the filtered status indicates that the email is spam.

4. The email filtering system of claim 1, wherein the junk store quarantines the email with the filtered status at the junk store when the filtered status indicates that the email is phishing.

5. The email filtering system of claim 1, wherein the junk store quarantines the email with the filtered status at the junk store when the filtered status indicates that the email contains a virus.

6. The email filtering system of claim 1, wherein the unified threat management gateway checks the internet protocol address of the mail transfer agent against an allow list and a block list on the unified threat management gateway.

7. The email filtering system of claim 1, wherein the unified threat management gateway checks the internet protocol address of the mail transfer agent by communicating with an internet protocol address reputation service.

8. The email filtering system of claim 1, wherein the first internet-based communication connection is a simple mail transfer protocol connection using port 25 of the unified threat management gateway.

9. The email filtering system of claim 1, wherein the second internet-based communication connection is a simple mail transfer protocol connection using port 25 of the email security appliance.

10. The email filtering system of claim 1, wherein the third internet-based communication connection is a simple mail transfer protocol connection using port 10025 of the unified threat management gateway.

11. The email filtering system of claim 1, wherein the unified threat management gateway scans the email received from the mail transfer agent for viruses before sending the email to the email security appliance.

12. The email filtering system of claim 1, wherein the junk store sends the email with the filtered status to a local mail server when the filtered status indicates that the email is non-phishing.

13. The email filtering system of claim 1, wherein the junk store sends the email with the filtered status to a local mail server when the filtered status indicates that the email is non-spam.

14. The email filtering system of claim 1, wherein the junk store sends the email with the filtered status to a local mail server when the filtered status indicates that the email does not contain a virus.

15. A non-transitory computer-readable storage medium, having embodied thereon instructions executable to perform a method of filtering email, the method comprising:
receiving an email at a unified threat management gateway from a mail transfer agent across a first internet-based communication connection;
checking a reputation of an internet protocol address of the mail transfer agent;
sending the email from the unified threat management gateway to an email security appliance across a second internet-based communication connection;
processing the email at the email security appliance to determine a filtered status of the email;
receiving the email with the filtered status at the unified threat management gateway from the security appliance across a third internet-based communication connection;
sending the email with the filtered status from the unified threat management gateway to a junk store across a local communication connection; and
sending email filter processing rules from the unified threat management gateway to the email security appliance, wherein the unified threat management gateway sends email filter processing rules using a custom simple mail transfer protocol HELO command using a transmission control protocol port, wherein the HELO command comprises ASCII encoded text using name-value pairs to convey information.

* * * * *